United States Patent [19]

Watkins et al.

[11] 4,018,285
[45] Apr. 19, 1977

[54] METHOD FOR CONTROLLING FINES MIGRATIONS

[75] Inventors: Larry A. Watkins, Houston; John W. Graham, Alvin; William M. Salathiel, Houston, all of Tex.

[73] Assignee: Exxon Production Research Company, Houston, Tex.

[22] Filed: Mar. 19, 1976

[21] Appl. No.: 668,557

[52] U.S. Cl. .............................................. 166/295
[51] Int. Cl.² ...................................... E21B 33/138
[58] Field of Search .................. 166/295, 294, 276

[56] References Cited

UNITED STATES PATENTS

| | | | |
|---|---|---|---|
| 3,294,165 | 12/1966 | Meijs et al. | 166/295 |
| 3,297,087 | 1/1967 | Spain | 166/295 |
| 3,305,017 | 2/1967 | Dollarhide | 166/295 |
| 3,327,783 | 6/1967 | Ayers | 166/295 X |
| 3,368,626 | 2/1968 | Bezemer et al. | 166/295 |
| 3,481,403 | 12/1969 | Gidley et al. | 166/295 |

*Primary Examiner*—Stephen J. Novosad
*Attorney, Agent, or Firm*—Salvatore J. Casamassima

[57] ABSTRACT

A method of controlling the migration of fines in a subterranean formation comprising contacting the formation with a dilute resin solution; displacing the resin solution into the formation, preferably with an overflush oil, so as to leave behind a thin film of resin solution; extracting the diluent present in the resin, and then curing the resin to an infusible state. The preferred resin is a one-step phenolic type resin which cures at formation temperatures and which should comprise from about 5 to about 30 weight percent of the resin solution and preferably about 10 to 20 weight percent.

21 Claims, 8 Drawing Figures

METHOD FOR CONTROLLING FINES MIGRATIONS

BACKGROUND OF THE INVENTION

1. Field of the Invention

This invention relates to the treatment of formations surrounding oil wells, gas wells and similar boreholes. In one aspect, it relates to the control of fines migration in a formation using resin applications.

2. Description of the Prior Art

Declines in the productivity of oil and gas wells are frequently caused by the migration of fines toward the wellbore of a subterranean formation. Fines, which normally consist of minutely sized clay and sand particles, can plug and damage a formation and may result in up to a 20-fold reduction in permeability. Conventional sand control techniques such as gravel packing and sand consolidation are sometimes ineffective because fines are much smaller than sand grains and normally cannot be filtered or screened out by gravel beds or consolidated sand. In addition, gravel packing and sand consolidation are normally confined to areas surrounding the immediate vicinity of the wellbore. Fines movement, however, can cause damage at points which are deep in the producing zone of the formation as well as points which are near the wellbore region.

Two types of fines control are in current use — acidizing and clay stabilization. Acidizing removes fines by dissolving them with acidic or caustic solutions. Acidizing, however, will frequently dissolve coarse particles, such as gravel and sand, as well as fines and excess acidization may regenerate fines if the coarser particles are sufficiently eroded. Clay stabilization is directed at the well damage caused by the migration of clay fines. Because clay fines have a tendency to swell in the presence of aqueous well fluids, they create disproportionately greater damage than other fines. Therefore, clay stabilization techniques are directed at either inhibiting clay swelling or flocculating the clay particles. Such preventive treatments are used only after the particles begin to move and do not prevent fines movement in the first instance. Clay stabilization also fails to control the migration of nonclay fines. Consequently, a treatment technique is needed which controls the fines before they even begin to migrate in the formation.

SUMMARY OF THE INVENTION

The method of the present invention for controlling the migration of formation fines is to entrap the fines on the walls of the formation with a thin resin film. This method effectively traps the fines between the formation walls and the resin film, thereby preventing their movement when fluids are subsequently produced from the formation.

Broadly, the invention comprises a sequence of treatment steps designed to place a thin film or coating of a resin on the formation walls. Preferably, the first step is to pre-treat the formation with a preflush solvent to miscibly displace any connate fluids present in the formation. This is followed with a dilute resin solution which preferably comprises a one-step phenolic type resin dissolved in a suitable diluent. Next, the resin solution is outwardly displaced from the pore spaces of the formation that are in the immediate vicinity of the wellbore, leaving behind a thin residual film of the resin solution on the formation walls. The diluent present in the resin solution is then extracted from the resin solution. The thin resin film which remains on the formation walls, cures in place at reservoir conditions to a hard infusible state. The formation fines in the treated zone are thereby trapped between the large sand grains of the formation and the resin film.

The preferred technique for displacing the resin solution and for extracting the diluent involves a two-step process. First, the formation is overflushed with an oil to displace the resin solution from the formation pore spaces. The overflush oil should only mildly extract the diluent from the resin solution. Then the diluent remaining in the residual film is substantially extracted with an aqueous solution such as brine. It should be noted, however, that displacement of the resin solution and extraction of the diluent can also be accomplished by a one-step brine injection.

Since the purpose of the resin film is to entrap or tie down formation fines and not to consolidate the formation, the resin solution injected into the formation can be very dilute. The solution should have no more than about 30 weight percent of a phenolic resin and it may be possible to use solutions containing as little as 5 weight percent resin. Such dilute solutions exhibit low viscosity and are readily pumped into the formation. Furthermore, the low resin concentration makes the solution very economical to apply. Large areas of the formation can, therefore, be coated with the resin, enabling most of the fines present in those areas of the formation to be tied down. Applying a dilute resin solution also minimizes the chance that any significant area of the formation will suffer a permanent reduction of permeability resulting from excess resin clogging the pore spaces of the formation. The dilute resin solution, having a low viscosity, is readily displaced through the formation pore spaces by the overflush oil.

DESCRIPTION OF THE PREFERRED EMBODIMENT

Figure 1:
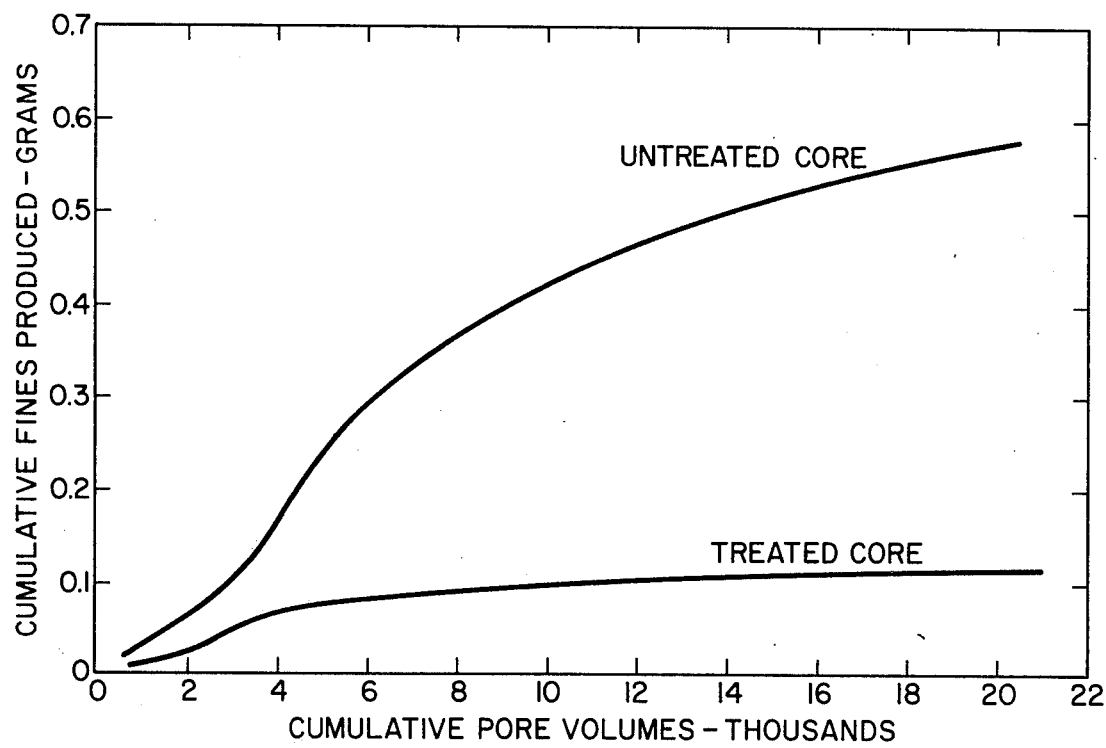
FIG. 1 is a plot of cumulative fines produced versus cumulative pore volume for treated and untreated sand cores.

The preferred method for applying a thin resin coating to the formation surface according to the present invention involves a multi-step treatment technique. Since most fines, especially clay fines, are weakly cemented or electrostatically attracted to the larger sand particles which make up the formation, this treatment will trap most of the fines present in the formation between the resin film and the sand particles. The application of the resin film effectively entraps the fines and prevents their migration through the pore spaces of the formation.

Prior to contacting the formation with any resin solution, the formation should be preflushed with a solvent. Normally, formation sands are water wet and their pores contain droplets of oil surrounded by brine. Since these connate fluids must be removed before the formation can be treated, it is usually necessary to precondition the formation by displacing the connate fluids with a preflush solvent. Preflushing is especially important in the present invention because connate fluids will inhibit the application of a very thin resin film. Improved wetting of the formation by the resin after the preflush treatment results in better resin distribution.

A preferred preflush solvent is one which is preferentially water soluble and which will miscibly displace connate fluids. A great number of solvents have been used or suggested as preflush fluids and include alcohols, aldehydes, ketones and glycol ethers. Solvents that are particularly useful in the practice of the present invention are those that are mutually miscible with oil and water. The mutually miscible solvents that are preferred are the $C_3$–$C_{10}$ alkyl ethers of polygycols, especially $C_3$–$C_8$ monoalkyl ethers of mono-, di-, tri-, or tetra-ethylene glycol. The solvent may be used in its pure form or with a suitable organic diluent such as isopropanol. For most applications the diluent will constitute the major volume of the preflush fluid and will consequently reduce the cost of the preflush fluid and improve its hydrophillic character. An extensive discussion of these preferred preflush solvents can be found in U.S. Pat. Nos. 3,481,403 and 3,902,557.

The second step is to inject a resin solution into the formation. A highly preferred resin solution comprises a one-step, alkaline catalyzed, phenolic resin dissolved in an alcohol diluent. The one-step resins are prepared by reacting an aldehyde such as formaldehyde, acetaldehyde or propionaldehyde with an hydroxyaryl compound such as phenol, cresol, resorcinol or xylenol in a mole ratio of between 1.5:1 and 1:1. The reaction takes place in the presence of an alkaline catalyst such as inorganic hydroxides, quarternary ammonium hydroxide or tertiary amines. Normally, the reaction is stopped when a solid, partially polymerized resin is formed. These resins are fusible, one-step thermosetting resins which are soluble in most organic solvents. Such resins are cured by the application of heat alone and require no additional catalyst or curing agent. The one-step resins are commercially available in powder form.

The resin solution can be prepared by dissolving a one-step phenolic resin in an alcohol diluent. The resin should comprise no more than about 30 weight percent of the resin solution and preferably should comprise from about 10 to about 20 weight percent. The preferred alcohol diluents are methanol, ethanol and isopropanol. Such diluents readily dissolve the one-step phenolic resins to form low viscosity resin solutions which are easily pumped into the formation. Methanol and ethanol, both being miscible with oil and water, will also serve the purpose of absorbing any remaining connate fluids which are present in the formation after the preflush treatment.

It is desirable to add a coupling agent to the resin solution to improve the bond between the formation substrate and the resin. For the phenolic type resins, the preferred coupling agent is an organo-functional silane compound such as aminoalkylsilane. These coupling agents are well known in the art and the most effective coupling agent can be selected for the particular resin system which is being used.

Injection of the resin solution will flood the entire formation with the solution including the pore spaces. Thus, it is necessary to first outwardly displace the resin solution from the formation pore spaces immediately surrounding the wellbore, leaving behind a residual film of resin solution, and then to extract the diluent from the residual film. Although it is possible to achieve displacement of solution and extraction of diluent in a single step by injecting an aqueous solution into the formation, the preferred technique is a two-step process involving oil overflushing and brine extraction.

The resin solution is readily displaced with an overflush oil. The overflush oil is normally a refined oil which is substantially free of aromatics and olefins. White oils and diesel oils which are immiscible with the resins and only partially miscible with the diluent should be selected because the main purpose of the overflush oil is to open pore spaces and leave behind a very thin residual film of the solution by effectively displacing the resin solution deeper into the formation. A preferred overflush oil is a refined paraffinic white oil which is sold under the tradename of Marcol 70 by the Exxon Chemical Company.

Since the overflush oil is partially miscible with the diluent but immiscible with the resin it will extract some of the diluent present in the residual film of resin solution. The remaining residual film, containing less diluent, will have a higher viscosity than the original solution and will stick more tenaciously to the formation walls, thereby preventing any further removal of resin from the formation. The remaining diluent can then be further extracted from the residual resin film with an aqueous solution, preferably brine. Brine, injected into the formation, will selectively extract the diluent and leave behind an extremely thin residual resin film on the formation substrate.

The final step of the process is to shut in the formation for about 24 hours to allow the resin to cure. Since the resin is already in a partially polymerized state, the in situ heating and fusing of the resin in the formation will complete the polymerization and will cure the resin to an infusible state. It is this last step which will insure that most of the fines present in the producing zone will be tied down to the formation surface by the thin resin coating.

There are several advantages to the fines control process of the present invention. First, since the resin, which is an expensive component in terms of total cost, is used at very dilute levels of concentration, large areas of the formation can be treated economically. Consequently, fines extending well into the producing zone of the formation can be entrapped. Furthermore, the resin solution, being very dilute, has a low viscosity — usually on the order of 10 centipoise, permitting it to be readily pumped through the production tubing. Therefore, all of the various fluids — preflush, solvent, resinous solution, overflush oil and brine — can be pumped through the production tubing in a "bullhead" operation, thereby eliminating the need for removing the production tubing from the wall and inserting a workstring for conducting the well treatment operation.

An advantage in using a one-step phenolic type resin in the present invention is that such a resin does not have to be catalyzed in order to cure. The resin, being partially polymerized when placed in the formation, will cure in situ at normal formation temperature to a hard infusible state. It is, therefore, unnecessary to place catalyst bearing oils in the formation to trigger polymerization of the resin. This is particularly important in the treatment of formations containing clay fines because clayey materials preferentially absorb catalysts and curing agents and inhibit the polymerization process. (See U.S. Pat. Nos. 3,384,173 and 3,384,174 which discuss the catalyst absorption problems associated with clay bearing formations.)

LABORATORY EXPERIMENTS

Laboratory experiments were conducted to determine the range of resin concentrations which can be effectively and economically used to control formation fines migration without substantially reducing formation permeability.

A laboratory sand pack was used to demonstrate the resin coating process and its influence upon fines migration. To simulate a Miocene sand formation, a steel core holder 1.5 inches in diameter and 24 inches long was packed with 18 inches of Brazos River sand and 6 inches of 20–40 mesh gravel. The gravel was used to represent a typical gravel pack. The core was initially saturated with brine to simulate a formation containing connate fluids.

Resin coating was accomplished by the following sequence of treatment steps:

1. Solvent preflush with 2-isopropoxyethanol which is sold under the tradename of UCAR Solvent AC.
2. Injection of a resin solution comprising 20 weight percent of a powdered phenol formaldehyde resin (sold by Union Carbide under the tradename BRPE4035) dissolved in methanol. The solution included a silane coupling agent to provide a strong bond between sand and resin.
3. Oil overflush with refined paraffinic white oil sold under the tradename of Marcol 70 by Exxon Chemical Company.
4. Extraction with brine solution.

The core was then sealed and placed in a 200° F oven overnight to permit curing of the resin film.

After application of the resin film was completed, the core was mounted in a flow loop to evaluate fines migration tendency. To obtain comparative data an untreated sand core sample was also tested in the flow loop.

The flow loop was designed to circulate an oil-water multi-phase mixture that might be typically produced from an oil bearing formation. A downstream analytical filter (5 micron rating) was used to catch most of the produced solids migrating from the same core and a fine polishing filter was used below the analytical filter to capture any extremely fine solids. Initial permeability measurements were also made to determine what, if any, reductions in permeability were caused by the application of the resin film.

The cumulative amount of solids produced on the downstream filters was indicative of fines migration through the sand cores. The results of the experiment are shown in FIG. 1 which is a plot of cumulative fines produced versus cumulative pore volumes of the oil-water mixture flowing through the sand core. It is quite apparent that the treated sand core effectively controls fine migration. After the flow of about 20,000 pore volumes of fluid through the sand core, the untreated core produced 0.55 grams of solids while the treated core produced only a little more than 0.10 grams of solids. Permeability measurements showed no distinguishable differences in permeability for either the treated and untreated cores.

Figure 2:
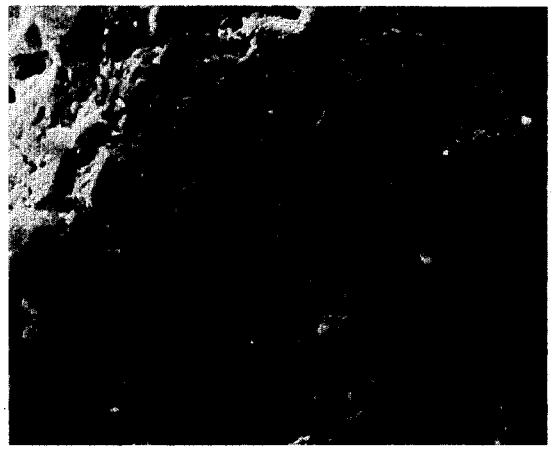
FIG. 2 is a photomicrograph of untreated sand particles.

FIG. 2 is a photomicrograph at 1000 magnification power of an untreated sand particle. Note that smaller particles (fines) cling to the surfaces of the larger sand grain. These smaller particles are frequently weakly cemented or electrostatically attracted to the larger grains and, in fact, may be merely lodged between the interstitial pore spaces of the larger grains. It is these small particles which are easily dislodged by formation fluids and which migrate toward the wellbore. The particles are about 40 microns or less in size and easily pass through the finest screens, gravel packs, and sand consolidations.

FIGS. 3 through 8 are photomicrographs of sand particles coated with the resin film. FIGS. 3 through 6 are photomicrographs, at 100 magnification power, of resin coated sand particles for which the concentration of resin in the treating resin solution was 5, 10, 20 and 30 weight percent, respectively.

Figure 3:
FIGS. 3–8 are photomicrographs of sand particles coated with thin resin films.

In FIG. 3, the photomicrograph shows that a 5 percent resin solution will apply a very thin "veil" of resin to the sand grains. Close examination of the photomicrograph reveals that not all of the fines are tied down by the resin film. This indicates that a 5 percent resin solution is near the lower concentration limit that can be used to achieve fines control. Note from the photomicrograph that the interstitial pore spaces between the sand grains are free of resin film. Thus, there was no measurable reduction in permeability caused by the 5 percent treatment.

Figure 4:
Figure 5:

FIGS. 4 and 5 show the results of 10 and 20 weight percent resin solution treatments. Note that the sand grains are completely coated with a resin film and that no loose fines are apparent. This indicates that the use of resin solutions having more than 10 weight percent of resin will achieve almost complete fines control. However, both photomicrographs reveal points of contact between the sand grains where the resin film has bridged the interstitial space between two grains. These points of contact are referred to as pendular rings and are indicative of an incipient weak consolidation of the sand grains. The pendular rings cause a slight blockage of the pore spaces but do not appreciably reduce permeability. FIG. 5 also shows that at 20 percent resin concentration the resin is sufficiently thick to form web-like layers on the sand grains.

Figure 6:
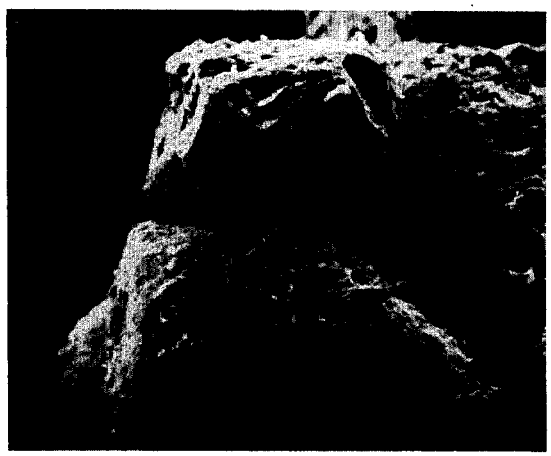
Figure 7:
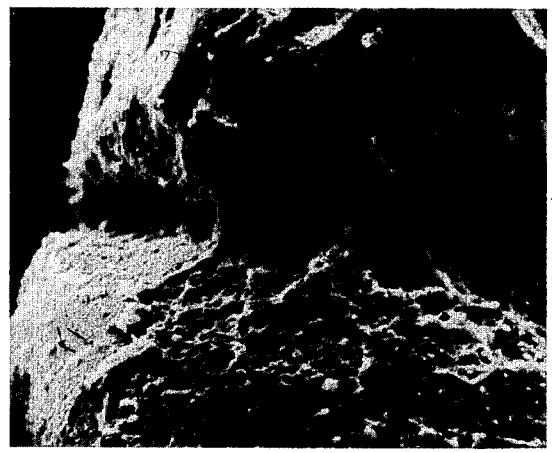
Figure 8:
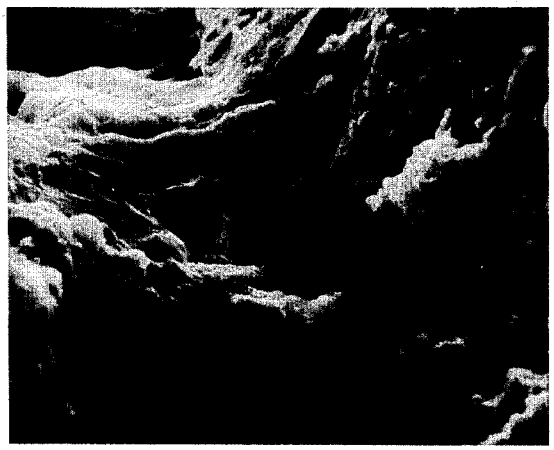

FIG. 6 is a photomicrograph of said grains treated with a 30 percent resin solution. The sand grains are heavily coated with resin and the resin also substantially fills the pore spaces between the particles. FIG. 7 is a 200 power magnification photomicrograph of the same pore space and FIG. 8 is a 1000 power magnification photomicrograph. Both of these photomicrographs clearly show the extensive bridging of resin between the sand particles indicating a possible reduction in permeability. Thus, a 30 percent resin solution is near the upper concentration limit that should be used to achieve fines control. Beyond 30 percent concentration, the pore spaces will be excessively plugged and blocked and a substantial reduction in permeability is likely to occur.

Tests conducted on the treated cores show that the treatment technique of the present invention will impart a compressive strength of nor more than about 300 psi to that area of the formation which has been coated with the resin film. This compares with sand consolidation treatments which generally achieve compressive strengths on the order of 600 psi or higher.

In summary, the laboratory experiments and photomicrographs prove that the resin treatment of the present invention will effectively control fines migration. But to achieve maximum fines control without damaging formation permeability, the concentration of resin in the resinous solution should be between about 5 and 30 weight percent and preferably between about 10 and 20 weight percent.

The principle of the invention and the best mode in which it is contemplated to apply the principle have been described. It is to be understood that the foregoing is illustrative only and that other means and techniques can be employed without departing from the true scope of the invention.

We claim:

1. A method for controlling the migration of fine particles in a subterranean formation surrounding a well comprising:
   contacting said formation with a dilute resin solution, said resin solution comprising a one-step phenolic type resin dissolved in a diluent, said resin having a concentration of between about 10 and 20 weight percent in said resin solution;
   outwardly displacing said resin solution into said formation so as to leave behind a thin residual resin film in the area of said formation which immediately surrounds said well;
   extracting said diluent from said resin film; and
   thereafter curing said resin film to an infusible state.

2. The method defined in claim 1 wherein said one-step phenolic resin is an alkaline catalyzed phenol formaldehyde.

3. The method defined in claim 1 wherein said one-step phenolic resin cures at the normal temperature of said formation.

4. The method defined in claim 1 wherein said resin solution further includes an organo-silicon coupling agent.

5. The method defined in claim 1 wherein said diluent is an alcohol.

6. The method defined in claim 5 wherein said alcohol is selected from the group consisting of methanol, ethanol and isopropanol.

7. The method defined in claim 1 wherein said resin solution is displaced from the pore spaces of said formation with an overflush oil.

8. The method defined in claim 7 wherein said overflush oil is a refined white oil.

9. The method defined in claim 1 wherein said diluent is extracted from said resin solution with brine.

10. The method defined in claim 1 wherein said formation is first preflushed with a solvent.

11. The method defined in claim 10 wherein said preflush solvent is preferentially water soluble.

12. The method defined in claim 1 wherein said resin film, after it is cured, imparts a compressive strength of not more than about 300 pounds per square inch to said formation.

13. A method for controlling the migration of fine particles in a subterranean formation surrounding a well comprising:
   preflushing said formation with a solvent to miscibly displace connate fluids present in said formation;
   injecting into said formation a dilute resin solution, said resin solution comprising a one-step phenolic type resin in a diluent, said resin having a concentration of between about 5 and 30 weight percent in said resin solution;
   overflushing said formation with an oil to outwardly displace said resin solution into said formation so as to leave behind a thin residual resin film in the area of said formation which immediately surrounds said well;
   extracting said diluent from said resin film with brine; and
   thereafter curing said resin film to an infusible state at normal formation temperatures.

14. The method defined in claim 13 wherein said resin comprises between about 20 and 30 weight percent of said resin solution.

15. The method defined in claim 13 wherein said resin is an alkaline catalyzed phenol formaldehyde.

16. The method defined in claim 13 wherein said resin solution further includes an organo-silicon coupling agent.

17. The method defined in claim 13 wherein said diluent is an alcohol.

18. The method defined in claim 17 wherein said alcohol is selected from the group consisting of methanol, ethanol and isopropanol.

19. The method defined in claim 13 wherein said resin film, after it is cured, imparts a compressive strength of not more than about 300 pounds per square inch to said formation.

20. A method for controlling the migration of fine particles in a subterranean formation surrounding a well comprising:
   preflushing said formation with a preferentially water soluble solvent to miscibly diplace connate fluids present in said formation;
   injecting into said formation a resin solution, said resin solution comprising a one-step phenolic type resin dissolved in a diluent and an organo-silicon coupling agent, said resin having a concentration of between about 5 and 30 weight percent in said resin solution;
   overflushing said formation with an oil to outwardly displace said resin solution into said formation so as to leave behind a thin residual resin film in the area of said formation which immediately surrounds said well;
   extracting said diluent from said resin film with brine; and
   thereafter curing said resin film to an infusible state at normal formation temperatures, said cured resin film imparting a compressive strength of not more than about 300 pounds per square inch to said formation.

21. The method defined in claim 20 wherein said resin has a concentration of between about 10 and 20 percent in said resin solution.

* * * * *